United States Patent
Oskam et al.

(10) Patent No.: US 6,917,153 B2
(45) Date of Patent: Jul. 12, 2005

(54) GAS DISCHARGE LAMP WITH DOWN CONVERSION LUMINOPHORE

(75) Inventors: Koert Oskam, Urecht (NL); Paul Peijzel, Zeist (NL); Andries Meijerink, Soesterberg (NL); Claus Feldmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 35 days.

(21) Appl. No.: 10/131,944

(22) Filed: Apr. 25, 2002

(65) Prior Publication Data

US 2002/0185961 A1 Dec. 12, 2002

(30) Foreign Application Priority Data

Apr. 27, 2001 (DE) .......................................... 101 21 097

(51) Int. Cl.$^7$ ................................................. H01J 61/44
(52) U.S. Cl. ............................... 313/483; 252/301.4 R; 313/486
(58) Field of Search .................. 313/486, 487, 313/567, 483, 484, 635; 252/301.4 R, 301.4 H; 315/246; 445/26

(56) References Cited

U.S. PATENT DOCUMENTS 5,325,016 A * 6/1994 Srivastava .................. 313/486
5,666,031 A * 9/1997 Jennato et al. ............... 315/246
6,157,145 A * 12/2000 Vollkommer et al. ........ 315/339
6,251,304 B1 * 6/2001 Wegh et al. ........... 252/301.4 R
6,600,260 B2 * 7/2003 Feldmann et al. ........... 313/486
2002/0027412 A1 * 3/2002 Yoshida et al. .............. 313/486
2002/0190645 A1 * 12/2002 Oskam et al. ............... 313/567

FOREIGN PATENT DOCUMENTS

| EP | WO 00/24028 | * | 4/2000 | ............ H01J/29/20 |
| EP | 001253624 A2 | * | 10/2002 | ............ H01J/61/44 |
| EP | 001253625 A2 | * | 10/2002 | ............ H01J/61/44 |
| JP | 2002020745 A | * | 1/2002 | ............ C09K/11/85 |

OTHER PUBLICATIONS

Rene T. Wegh et al., "Visible Quantum Cutting in LiGdF$_4$:Eu$^{3+}$ Through Downconversion" Science 283, 663–666 Jan. 29, 1999, vol. 283.

* cited by examiner

Primary Examiner—Vip Patel
Assistant Examiner—Glenn Zimmerman

(57) ABSTRACT

A luminophore capable of down conversion has a host lattice with a pair of activators of a first lanthanoid ion and a second lanthanoid ion and a co-activator of a third lanthanoid ion. A gas discharge lamp fitted with a gas discharge vessel filled with a gas filling which is suitable for a gas discharge which emits VUV radiation, and has a luminophore coating containing the down conversion luminophore is environmentally friendly and has good lamp efficiency.

7 Claims, 1 Drawing Sheet

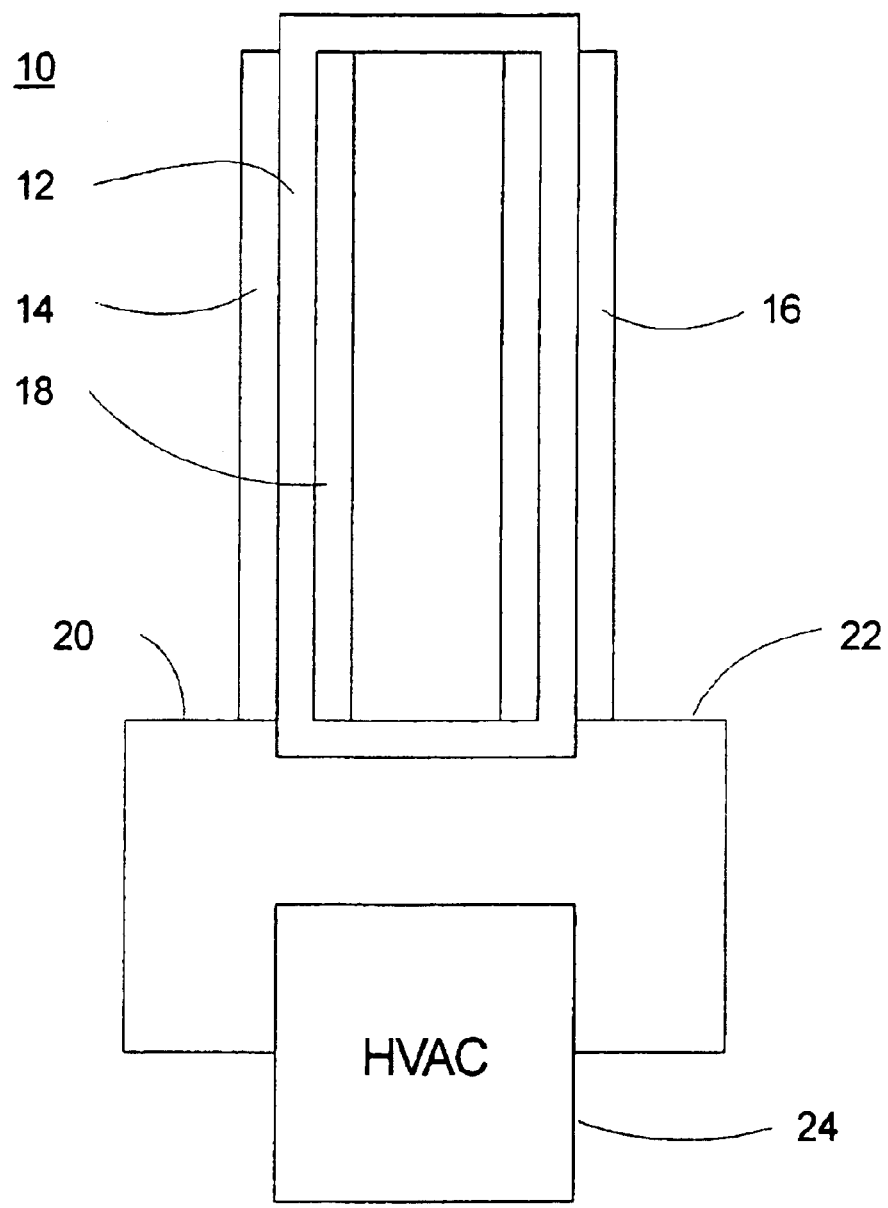

GAS DISCHARGE LAMP WITH DOWN CONVERSION LUMINOPHORE

The invention relates to a gas discharge lamp fitted with a gas discharge vessel filled with a gas suitable for supporting a gas discharge emitting VUV radiation, with a luminophore coating containing a down conversion luminophore and with means for igniting and maintaining a gas discharge.

Conventional fluorescent lamps are mercury gas discharge lamps, the light emission of which is based on mercury low pressure gas discharge. A mercury low pressure gas discharge emits radiation mainly in the near UV with a maximum at 254 nm which is converted into visible light by UV luminophores.

The mercury gas discharge lamp has a refined technology and with regard to the lamp efficiency $\eta_{lamp}$ can only be matched or exceeded with difficulty by other lamp technologies.

The mercury in the gas filling is however increasingly regarded as an environmentally harmful and toxic substance which should be avoided as far as possible in modem mass production because of environmental risks in use, production and disposal. Therefore for some time efforts have been concentrated on the development of alternative lamp technologies.

One of the mercury-free or low-mercury alternatives to the conventional mercury gas discharge lamp is the xenon low pressure gas discharge lamp which has a gas filling containing mostly xenon. A gas discharge in a xenon low pressure gas discharge lamp emits vacuum ultraviolet radiation (VUV radiation) in contrast to the UV radiation of the mercury discharge. The VUV radiation is generated by excimers e.g. $Xe_2^*$, and is a molecular band radiation with a broad spectrum in the range about 172 nm. Using this lamp technology discharge efficiencies $\eta_{dis}$ of 65% are achieved.

Another advantage of the xenon low pressure gas discharge lamp is the short response time of the gas discharge which makes it useful as a signal lamp for automobiles, as a lamp for copier or fax devices and as a water disinfection lamp.

However although the xenon gas discharge lamp has achieved a discharge efficiency $\eta_{dis}$ which is comparable to that of the mercury gas discharge lamp, the lamp efficiency $\eta_{lamp}$ of the xenon gas discharge lamp is still clearly lower than that of the mercury gas discharge lamp.

In principle the lamp efficiency $\eta_{lamp}$ consists of the components discharge efficiency $\eta_{dis}$, luminophore efficiency $\eta_{phos}$, the proportion of the generated visible light which leaves the lamp $\eta_{esc}$ and the proportion $\eta_{vuv}$ of UV radiation generated by the luminophore:

$$\eta_{lamp} = \eta_{dis} \cdot \eta_{phos} \cdot \eta_{esc} \cdot \eta_{vuv}.$$

One handicap of the conventional xenon low pressure gas discharge lamp lies in the conversion, ineffective in principle, of an energy-rich VUV photon with wavelength of around 172 nm into a comparatively low energy photon from the visible spectrum of 400 nm to 700 nm through the luminophore coating of the lamp. Even if the quantum efficiency of the luminophore is close to 100%, by conversion of a VUV photon into a visible photon, on average 65% of the energy is lost due to radiationless transition.

Surprisingly however it has already been possible to develop VUV luminophores which achieve a quantum efficiency of more than 100% for conversion of VUV photons into visible photons. This quantum efficiency is achieved in that a VUV quantum with an electron energy of 7.3 eV is converted into two visible quantums with an electron energy of 2.5 eV. Such luminophores for xenon low pressure gas discharge lamps are known for example from René T. Wegh, Harry Donker, Koentraad D. Oskam, Andries Meijerink "Visible Quantum Cutting in $LiGdF_4:Eu^{3+}$ through Downconversion" Science 283, 663.

In analogy to the multiphoton luminophores known for some time, which through "up conversion" generate from two visible long-wave photons one short-wave photon, these new luminophores, which generate from one short-wave photon two long-wave photons, are known as down conversion luminophores.

A disadvantage is that so far only red and violet down conversion luminophores are known.

It is an object of the present invention to develop a gas discharge lamp fitted with a gas discharge vessel filled with a gas suitable for gas discharge which emits VUV radiation, with a luminophore coating which contains a down conversion luminophore and with means for igniting and maintaining a gas discharge, the color spectrum of which is extended.

According to the invention this object is achieved by a gas discharge lamp fitted with a gas discharge vessel filled with a gas filling suitable for supporting a gas discharge emitting VUV radiation, with a luminophore coating containing a down conversion luminophore and with means for igniting and maintaining a gas discharge, in which the down conversion luminophore contains a pair of activators of a first lanthanoid ion and a second lanthanoid ion and a co-activator.

Particularly advantageous effects in relation to the state of the art are obtained by the invention if the first lanthanoid ion is the gadolinium 3+ ion and the second lanthanoid ion is the holmium 3+ ion.

A gas discharge lamp of the stated type is obtained which emits light in the red or green range of the electromagnetic spectrum. Together with other luminophores in the coating, a gas discharge lamp of said type can be provided, the luminophore coating of which comprises a broad white color spectrum.

As part of the present invention it is preferred that the third lanthanoid ion is selected from the group of the terbium 3+ ion, ytterbium 3+ ion, dysprosium 3+ ion, europium 3+ ion, samarium 3+ ion and manganese 2+ ion.

In one embodiment of the invention the host lattice of the down conversion luminophore is a fluoride.

It is particularly preferred that the host lattice of the down conversion luminophore is a fluoride of the composition $M^3F_3$ with $M^3$=Al, In, Ga, Sc, Y, La and the lanthanoids.

It is also preferred that the down conversion luminophore contains the first lanthanoid ion in a concentration of 10 to 99.98 mol % and the second lanthanoid ion in a concentration of 0.01 to 30 mol %.

It can also be preferred that the down conversion luminophore contains the third lanthanoid ion in a concentration of 0.01 to 30 mol %, in particular in a concentration of 0.5 mol %.

The invention also relates to a down conversion luminophore which contains in a host lattice a pair of activators from a first lanthanoid ion and a second lanthanoid ion and a co-activator of a third lanthanoid ion. Such a luminophore can advantageously be used for signaling lamps in motor vehicles and in plasma screens.

These and other aspects of the invention are apparent from and will be elucidated with reference to the embodiments described hereinafter.

The FIGURE shows a gas discharge lamp embodying the present invention.

The invention is now described in more detail with reference to the drawing FIGURE.

A gas diascharge lamp 10 according to the invention comprises a gas discharge vessel 12 with a gas filling and with at least one wall which has a surface partially transparent to visible radiation with a luminophore layer 18. The luminophore coating 18 contains a luminophore preparation with a down conversion luminophore of an inorganic crystalline host lattice which has obtained its luminosity from activation through an activator pair of a first and a second lanthanoid ion and a co-activator of a third lanthanoid ion. Also the gas discharge lamp 10 is fitted with an electrode structure (14, 16) to ignite the gas discharge and with further means (24) to ignite and maintain the gas discharge.

Preferably the gas discharge lamp is a xenon low pressure gas discharge lamp. Various types of xenon low pressure gas discharge lamps are known which differ in the ignition of the gas discharge. The spectrum of gas discharge first contains a high proportion of VUV radiation invisible to human eye which is converted into visible light in the coating of VUV luminophores on the inside of the gas discharge vessel and then radiated. The term "vacuum ultraviolet radiation" below also refers to electromagnetic radiation with a maximum emission in a wavelength range between 145 and 185 nm.

In a typical construction for the gas discharge lamp 10 this consists of a cylindrical glass lamp bulb 12 filled with xenon, on the wall of which on the outside is arranged a pair of strip-like electrodes (14, 16) electrically insulated from each other. The strip-like electrodes (14, 16) extend over the entire length of the lamp bulb 12, where their long sides lie opposite each other leaving two gaps. The electrodes (14, 16) are connected via leads (20,22) to the poles of a high voltage source (HVAC, 24) operated with an alternating voltage of the order of 20 kHz to 500 kHz such that an electric discharge forms only in the area of the inner surface of the lamp bulb.

When an alternating voltage is applied to the electrodes, in the xenon-containing filler gas a silent electrical discharge can be ignited. As a result in the xenon are formed excimers i.e. molecules which consist of an excited xenon atom and a xenon atom in the basic state.

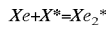

$$Xe+X^*=Xe_2^*$$

The excitation energy is emitted again as VUV radiation with a wavelength of $\lambda=170$ to 190 nm. This conversion from electron energy into UV radiation is highly efficient. The generated VUV photons are absorbed by the luminophores of the luminophore layer and the excitation energy partly emitted again in the longer wavelength range of the spectrum.

In principle for the discharge vessel a multiplicity of forms are possible such as plates, single tubes, coaxial tubes, straight, U-shaped, circular curved or coiled, cylindrical or other shape discharge tubes.

As a material for the discharge vessel quartz or glass types are used.

The electrodes consist of a metal e.g. aluminum or silver, a metal alloy or a transparent conductive inorganic compound e.g. ITO. They can be formed as a coating, as an adhesive foil, a wire or a wire mesh.

The discharge vessel is filled with a gas mixture containing a noble gas such as xenon, krypton, neon or helium. Gas fillings which mainly consist of oxygen-free xenon at low gas pressure, e.g. 2 Torr, are preferred. The gas filling can also contain a small quantity of mercury in order to maintain a low gas pressure during discharge.

The inner wall of the gas discharge vessel is coated partly or fully with a luminophore coating which contains one or more luminophores or luminophore preparations. The luminophore layer can also contain organic or inorganic binding agents or a binding agent combination.

The luminophore coating is preferably applied to the inner wall of the gas discharge vessel as a substrate and can comprise a single luminophore layer or several luminophore layers, in particular double layers of a base and a cover layer.

A luminophore coating with base and cover layer allows the quantity of down conversion luminophore in the cover layer to be reduced and in the base layer a less costly luminophore to be used. The base layer preferably contains as a luminophore a calcium-halophosphate luminophore selected to achieve the desired shade of the lamp.

The cover layer contains the down conversion luminophore which thus forms an essential part of the UV radiation generated by gas discharge to be converted directly into the required radiation in the visible range.

The luminophore is a luminophore with activators in a host lattice. An essential feature of the luminophore according to the invention is that it contains a pair of activators of a first and a second lanthanoid ion and a co-activator in a host lattice.

The first lanthanoid ion of the activator pair is the gadolinium 3+ ion, the second lanthanoid ion of the activator pair is the holmium 3+ ion. The co-activator is selected from the group of the trivalent ions of terbium, ytterbium, dysprosium, europium and samarium and the bivalent ions of manganese. The pair of activators from a first lanthanoid ion and a second lanthanoid ion and the co-activator ion co-operate in the sequential emission of the photons with which the luminophore generates more than one visible photon from a VUV photon.

The excitation mechanism can take place by the $^8S$-$^6G$ excitation of the gadolinium 3+ ion which follows a cross relaxation transition between the Gd 3+ ion and the holmium 3+ ion. Due to the cross relaxation transition the gadolinium 3+ ion changes from the $^6G$-state to the $^6P$-state, the released energy raises the holmium 3+ ion from the $^5I_8$-state to the $^5F_5$-state. The holmium 3+ ion then emits a visible photon, the energy of which corresponds to the transition from $^5F_5$ to $^5I_8$.

After an energy transfer from the $^6P$-state of the gadolinium 3+ ion to the co-activator, this also emits a visible photon.

The host lattice of the down conversion luminophore can consist of inorganic material such as fluorides, oxides halogenides, aluminates, gallates, phosphates, borates or silicates, doped with a few percent of both activators. The activators can be arranged on lattice places or on interstitial lattice places of the host lattice.

As a host lattice are preferred fluorides e.g. fluorides of composition $M^1F$ with $M_1$=Li, Na, K, Rb, Cs or fluorides of composition $M^2F_2$ with $M^2$=Mg, Ca, Sr, Ba or fluorides of composition $M^3F_3$ with $M^3$=B, Al, In, Ga, Sc, Y, La and lanthanoids. Particularly preferred is $GaF_3$ in which the first lanthanoid activator ion $Ga^{3+}$ is part of the host lattice.

Furthermore as host lattices are preferred ternary gadolinium-containing fluorides of the composition $M^1GdF_4$, $M^1_2GdF_5$, $M^1_3GdF_6$, $M^1Gd_2F_7$, $M^1Gd_3F_{10}$, $M^1_5Gd_9F_{32}$, with $M_1$=Li, Na, K, Rb, Cs or $M^2GdF_5$, $M^2_2GdF_7$, $M^2_3GdF_9$, $M^2Gd_2F_8$, $M^2Gd_3F_{11}$, $M^2Gd_4F_{14}$, $M^2_{13}Gd_6F_{43}$ with $M^2$=Mg, Ca, Sr, Ba, Mn, Zn in which gadolinium is also part of the host lattice.

Also preferred as host lattices are fluorides of the composition $M^1M^3F_4$, $M^1_2M^3F_5$, $M^1_3M^3F_6$, $M^1M^3_2F_7$, $M^1M^3{}_3F_{10}$, $M^1{}_5M^3{}_9F_{32}$ with $M_1$=Li, Na, K, Rb, Cs and with $M^3$=B, Al, In, Ga, Sc, Y, La, and the lanthanoids; $M^2M^3F_5$, $M^2{}_2M^3F_7$, $M^2{}_3M^3F_9$, $M^2M^3{}_2F_8$, $M^2M^3{}_3F_{11}$, $M^2M^3{}_4F_{14}$, $M^2{}_{13}M^3{}_6F_{43}$ with $M^2$=Mg, Ca, Sr, Ba, Mn, Zn and $M^3$=B, Al, In, Ga, Sc, Y, La, and the lanthanoids; $M^3M^4F_7$, $M^3{}_2M^4F_{10}$, $M^3{}_3M^4F_{13}$, $M^3M^4{}_2F_{11}$, $M^3M^4{}_3F_{15}$, $M^3M^4{}_4F_{19}$ with $M^3$=B, Al, In, Ga, Sc, Y, La, and the lanthanoids, and $M^4$=Ti, Zr, Si, Ge, Sn, Pb.

Particularly preferred as host lattices are fluorides of which the host lattice is based on the calcium fluoride crystal lattice type. In these lattices the cations have an 8-fold co-ordination. Also particularly preferred are fluorides with a lattice derived from the $YF_3$ crystal lattice type in which the cations have a 9-fold co-ordination. Due to the high co-ordination figures and the non-polar ligands, these host lattices are characterized by a low ligand field for cations which are part of the host lattice.

The luminophores doped with the activator pair contain preferably 10 to 99.8 mol % of the trivalent gadolinium and 0.01 to 30 mol % of the trivalent holmium.

The down conversion luminophore can easily be doped with the trivalent co-activators terbium, ytterbium, dysprosium, europium, samarium or manganese if, in the production of the luminophores, to the starting compounds is added a fluoride selected from the group $TbF_3$, $YbF_3$, $DyF_3$, $EuF_3$, $SmF_e$ or $MnF_2$.

The absorption co-efficient of said luminophores is particularly large for the wavelengths in the range of xenon radiation, and the quantum efficiency levels are high. The host lattice is not a factor in the luminescence process but influences the precise position of the energy level of the activator ions and consequently the wavelengths of absorption and emission. The activator pair $Gd^{3+}$—$Ho^{3+}$ in the various host lattices has a strong absorption band in vacuum UV at 273 nm. The emission bands lie in the range from long ultraviolet to yellow-orange, but mainly in the red and green range of the electromagnetic spectrum. The extinction temperature of these luminophores is above 100° C.

The grain size of the luminophore particles is not critical. Normally the luminophores are used as fine grain powders with a grain-size distribution between 1 and 20 $\mu$m.

As a production process for luminophore layers on a wall of the discharge vessel both dry coating processes e.g. electrostatic deposition or electrostatic-supported sputtering, or wet coating processes e.g. dip coating or spraying, can be considered.

For wet coating processes the luminophore preparation must be dispersed in water, an organic solvent where applicable together with a dispersion agent, a tenside and an anti-foaming agent or a binding agent preparation. Suitable binding agent preparations for a gas discharge lamp according to the invention are organic or inorganic binding agents which tolerate an operating temperature of 250° C. without destruction, embrittlement or discoloration.

For example the luminophore preparation can be applied to a wall of the discharge vessel by means of a flow coating process. The coating suspensions for the flow coating process contain water or an organic compound such as butylacetate as a solvent. The suspension is stabilized and its rheological properties influenced by the addition of additives such as stabilizers, liquifiers, cellulose derivatives. The luminophore suspension is applied to the vessel walls as a thin layer, dried and burned in at 600° C.

It can also be preferred that the luminophore preparation for the luminophore layer is deposited electrostatically on the inside of the discharge vessel.

For a gas discharge lamp which is to emit white light, preferred substances are a blue-emitting luminophore from the group $BaMgAl_{10}O_{17}$:$Eu^{2+}$; $Sr_3(PO_4)Cl$: $Eu^{2+}$ combined with a red-green-emitting luminophore according to the invention.

The luminophore layer usually has a layer thickness of 5 to 100 $\mu$m.

The vessel is then evacuated to remove all gaseous contaminants in particular oxygen. The vessel is then filled with xenon and sealed.

EXAMPLE 1

A cylindrical glass discharge vessel with a length of 590 mm, a diameter of 24 mm and a wall thickness of 0.8 mm is filled with xenon at a pressure of 200 hPa. The discharge vessel contains an axis-parallel internal electrode in the form of a noble metal rod of 2.2 mm diameter. On the outside of the discharge vessel is the external electrode of two strips of conductive silver 2 mm in width arranged axis-parallel and connected conductively with the power supply. The lamp is operated with pulsed DC voltage.

The inner wall of the discharge vessel is coated with a luminophore layer.

The luminophore layer contains a three-band luminophore mixture with the following components: $BaMgAl_{10}O_{17}$:$Eu^{2+}$ as the blue component and $GdF_3$:Ho,Tb as the green-red component.

To produce the $GdF_3$:Ho,Tb with 1.0 mol % holmium and 0.5 mol % terbium, 29.55 g $GdF_3$, 0.31 g $HoF_3$ and 0.15 g $TbF_3$ were thoroughly mixed and ground in an agate mortar. The mixture was preburned in a corundum crucible in a quartz tube under atmosphere of argon with a pressure of 8 hPa for 2 hours at 300° C. During burning the quartz tube was flushed with argon three times and evacuated again to 8 hPa. The oven temperature was then increased at a rate of 5.5° C. per min to 650° C. and the mixture sintered for 8 hours at 650° C. The sintered powder was reground and sieved to a grain size <40 $\mu$m. The crystal structure of the formed phase was checked with X-ray diffractometry.

With this lamp a light efficiency of initially 37 lm/W was achieved. After 1000 operating hours the light efficiency was 34 lm/W. The quantum efficiency for VUV light is approximately 70%.

EXAMPLE 2

A cylindrical glass discharge vessel with a length of 590 mm, a diameter of 24 mm and a wall thickness of 0.8 mm is filled with xenon at a pressure of 200 hPa. The discharge vessel contains an axis-parallel internal electrode in the form of a noble metal rod of 2.2 mm diameter. On the outside of the discharge vessel is the external electrode of two strips of conductive silver 2 mm in width arranged axis-parallel and connected conductively with the power supply. The lamp is operated with pulsed DC voltage.

The inner wall of the discharge vessel is coated with a luminophore layer.

The luminophore layer contains a three-band luminophore mixture with the following components: $BaMgAl_{10}O_{17}$:$Eu^{2+}$ as the blue component and $LiGdF_4$:Ho, Tb as the green-red component.

To produce the $LiGdF_4$:Ho,Tb with 1.0 mol % holmium and 0.5 mol % terbium, 29.55 g $GdF_3$, 3.64 g LiF, 0.31 g $HoF_3$ and 0.15 g $TbF_3$ were thoroughly mixed and ground in an agate mortar. The mixture was preburned in a corundum crucible in a quartz tube under atmosphere of argon with a pressure of 8 hPa for 2 hours at 300° C. During burning the quartz tube was flushed with argon three times and evacuated again to 8 hPa. The oven temperature was then increased at a rate of 5.5° C. per min to 650° C. and the mixture sintered for 8 hours at 650° C. The sintered powder was reground and sieved to a grain size <40 µm. The crystal structure of the formed phase was checked with X-ray diffractometry.

With this a light efficiency of initially 37 lm/W was achieved. After 1000 operating hours the light efficiency was 34 lm/W. The quantum efficiency for VUV light is approximately 70%.

What is claimed is:

1. A gas discharge lamp fitted with a gas discharge vessel filled with a gas filling suitable for a gas discharge which emits VUV radiation, with a luminophore coating containing a down conversion luminophore, and with means for igniting and maintaining a gas discharge, in which the down conversion luminophore consists of in a host lattice a pair of activators of a first lanthanoid ion gadolinium 3+ and a second lanthanoid ion holmium 3+ and a co-activator of a third ion selected from the group of terbium 3+ ion, ytterbium 3+ ion, dysprosium 3+ ion, europium 3+ ion, samarium 2+ ion and manganese 2+ ion.

2. A gas discharge lamp as claimed in claim 1, characterized in that the host lattice of the down conversion luminophore is a fluoride.

3. A gas discharge lamp as claimed in claim 1, characterized in that the host lattice of the down conversion luminophore is a fluoride with the composition $M^3 F_3$ with $M^3$ is one or more of the elements selected from the group consisting of Al, In, Ga, Sc, Y, La and the lanthanoids.

4. A gas discharge lamp as claimed in claim 1, characterized in that the down conversion luminophore contains the first lanthanoid ion in a concentration of 10 to 99.8 mol % and the second lanthanoid ion in a concentration of 0.01 to 30 mol %.

5. A gas discharge lamp as claimed in claim 1, characterized in that the down conversion luminophore contains the third lanthanoid ion in a concentration of 0.01 to 30 mol %.

6. A gas discharge lamp as claimed in claim 1, characterized in that the down conversion luminophore contains the third lanthanoid ion in a concentration of 0.5 mol %.

7. A down conversion luminophore consisting of in a host lattice a pair of activators of a first lanthanoid ion gadolinium 3+ and a second lanthanoid ion holmium 3+ and a co-activator of a third ion selected from the group of terbium 3+ ion, ytterbium 3+ ion, dysprosium 3+ ion, europium 3+ ion, samarium 2+ ion and manganese 2+ ion.

* * * * *